(12) United States Patent
Behringer (10) Patent No.: US 9,561,554 B2
(45) Date of Patent: Feb. 7, 2017

(54) SAW DEVICE AND METHOD FOR SAWING A WORKPIECE

(71) Applicant: Behringer GmbH, Kirchardt (DE)

(72) Inventor: Christian Behringer, Kirchardt (DE)

(73) Assignee: Behringer GmbH, Kirchardt (DE)

( * ) Notice: Subject to any disclaimer, the term of this patent is extended or adjusted under 35 U.S.C. 154(b) by 0 days.

(21) Appl. No.: 14/512,522

(22) Filed: Oct. 13, 2014

(65) Prior Publication Data

US 2015/0135918 A1    May 21, 2015

Related U.S. Application Data

(63) Continuation of application No. 12/653,552, filed on Dec. 14, 2009, now abandoned, which is a (Continued)

(30) Foreign Application Priority Data

Jun. 19, 2007  (DE) .................. 10 2007 029 292

(51) Int. Cl.
*B23D 55/04* (2006.01)
*B23D 53/00* (2006.01)
*B23D 55/08* (2006.01)

(52) U.S. Cl.
CPC .......... *B23D 55/043* (2013.01); *B23D 53/005* (2013.01); *B23D 55/082* (2013.01); *Y10T 83/0467* (2015.04); *Y10T 83/0586* (2015.04); *Y10T 83/2087* (2015.04); *Y10T 83/2092* (2015.04); *Y10T 83/2209* (2015.04); *Y10T 83/4559* (2015.04); *Y10T 83/4577* (2015.04); *Y10T 83/647* (2015.04); *Y10T 83/7164* (2015.04); *Y10T 83/7189* (2015.04)

(58) Field of Classification Search
CPC .... B23D 55/043; B23D 47/042; B23D 53/005
USPC .............. 83/20, 277, 404, 404.4, 803, 425.4
See application file for complete search history.

(56) References Cited

U.S. PATENT DOCUMENTS 2,898,669 A    8/1959  Crane et al.
3,871,258 A    3/1975  Hurn
(Continued)

FOREIGN PATENT DOCUMENTS

DE    197 56 622    11/1998
EP    1 277 536    1/2003
(Continued)

*Primary Examiner* — Kenneth E Peterson
(74) *Attorney, Agent, or Firm* — Lipsitz & McAllister, LLC (57) ABSTRACT

In order to improve a saw device with a feed axis for a workpiece to be sawed, with a first saw unit to saw the workpiece in a first sawing plane extending transversely to the feed axis and with a second saw unit to saw the workpiece in a second sawing plane extending transversely to the feed axis, with a central device region arranged between the sawing planes, with a front device region arranged in front of the first sawing plane, viewed in a feed direction, and with a rear device region arranged behind the second sawing plane, viewed in the feed direction, in such a way that as high a cutting efficiency as possible can be achieved, it is proposed that the saw device comprises at least two transport mechanisms arranged in different device regions to transport different workpiece portions along the feed axis.

1 Claim, 10 Drawing Sheets

Related U.S. Application Data continuation of application No. PCT/EP2008/057807, filed on Jun. 19, 2008.

(56) References Cited

U.S. PATENT DOCUMENTS

| | | | | |
|---|---|---|---|---|
| 4,031,790 A | * | 6/1977 | Arvidsson | B27B 5/228 |
| | | | | 144/356 |
| 4,468,993 A | * | 9/1984 | McCown | B23D 59/008 |
| | | | | 83/112 |
| 4,805,500 A | | 2/1989 | Saito et al. | |
| 4,909,112 A | * | 3/1990 | Rosenthal | B23D 59/001 |
| | | | | 83/425.4 |
| 4,960,023 A | * | 10/1990 | Reuter | B23D 47/02 |
| | | | | 83/368 |
| 5,086,678 A | * | 2/1992 | Aoyagi | B21D 43/006 |
| | | | | 198/803.14 |
| 5,241,887 A | * | 9/1993 | Wolff | B26D 1/20 |
| | | | | 83/248 |
| 5,301,578 A | * | 4/1994 | Fromson | B26D 5/00 |
| | | | | 83/214 |
| 6,158,318 A | | 12/2000 | Niemelä | |
| 2005/0155475 A1 | | 7/2005 | Desrosiers | |
| 2007/0028742 A1 | * | 2/2007 | Mueller | B26D 1/157 |
| | | | | 83/676 |
| 2007/0214924 A1 | | 9/2007 | Jourdan et al. | |

FOREIGN PATENT DOCUMENTS

| | | |
|---|---|---|
| FR | 2 216 073 | 8/1974 |
| WO | WO 03/092943 | 11/2003 |

* cited by examiner

SAW DEVICE AND METHOD FOR SAWING A WORKPIECE

This application is a continuation of U.S. patent application Ser. No. 12/653,552 filed on Dec. 14, 2009, now abandoned, which is a continuation of international application number PCT/EP2008/057807 filed on Jun. 19, 2008, and claims priority to German application number 10 2007 029 292.0 filed on Jun. 19, 2007, each of which is hereby incorporated herein by reference in their entirety and for all purposes.

BACKGROUND OF THE INVENTION

The invention relates to a saw device with a feed axis for a workpiece to be sawed, with a first saw unit to saw the workpiece in a first sawing plane extending transversely to the feed axis and with a second saw unit to saw the workpiece in a second sawing plane extending transversely to the feed axis, with a central device region arranged between the sawing planes, with a front device region arranged in front of the first sawing plane, viewed in a feed direction, and with a rear device region arranged behind the second sawing plane, viewed in the feed direction.

A saw for sawing a workpiece is known from US 2005/0155475 A1, the workpiece being conveyed on a belt. This saw comprises a first saw head and a second saw head, which are in each case assembled on a sawing bench.

A horizontal band saw machine is known from EP 1 277 536 A2, which has a saw head which ascends and descends vertically. In a method which can be carried out with this saw machine to separate severed parts of a metal rod, the movement of the saw head is continued in a downward stroke until a band saw blade is received in a lower receiver, the metal rod moving successively in a forward direction, pushing separated workpieces and then moving in the opposite direction and in the process providing a free space between the metal rod and the workpieces for an upward return stroke.

SUMMARY OF THE INVENTION

The present invention is based on the object of improving a saw device of the type mentioned at the outset in such a way that the cutting efficiency can be further increased.

This object is achieved according to the invention in a saw device of the type mentioned at the outset in that the saw device comprises at least two transport mechanisms arranged in different device regions for transporting different workpiece portions along the feed axis.

The saw device according to the invention allows simple transporting of different workpiece portions of the workpiece. These workpiece portions are produced by sawing the workpiece in the two sawing planes.

At least two workpiece portions can be transported independently of one another along the feed axis with the aid of the transport mechanisms. This allows the cut face of a workpiece portion produced by sawing the workpiece to be removed from a sawing plane in order to space it apart from a sawing tool of a saw unit acting in this sawing plane. As a result, the sawing tool is freed, so that after completion of a sawing process, it can be moved without wear-intensive contact with adjacent cut faces of the workpiece portions inside the sawing plane and can return to a rest position. As a result, the operating time of the sawing tool of a saw unit can be extended and the cutting efficiency of the saw device can be increased.

The saw device according to the invention is particularly suitable for producing very large-area sawing cuts.

The first sawing plane and/or the second sawing plane are advantageously perpendicular or substantially perpendicular to the feed axis. As a result, the sawing cut faces can be minimized.

It is favorable if the feed axis extends in a horizontal direction in relation to the direction of gravity. This facilitates transport of individual workpiece portions independently of one another.

It is further preferred if the first sawing plane and/or the second sawing plane extends or extend in a vertical direction in relation to the direction of gravity. This allows simple guidance of the sawing tools acting in the sawing planes.

It is particularly advantageous if the spacing between the first sawing plane and the second sawing plane can be adjusted. This allows a length of a workpiece portion to be produced by sawing the workpiece to be adjusted.

According to an advantageous embodiment of the invention, the first saw unit can be moved in a direction parallel to the feed axis. This allows positioning of the first sawing plane relative to the second sawing plane. The movability of the first saw unit has the further advantage that a particularly simple freeing of a sawing tool from cut faces of the workpiece portions produced by sawing the workpiece is possible. This will be explained in more detail below, with reference to a method according to the invention for sawing a workpiece.

It is particularly advantageous if the saw device comprises a first saw unit drive for a movement of the first saw unit in a direction parallel to the feed axis. This allows the movement of the first saw unit to be automated.

It is further preferred if the saw device comprises a first guide mechanism for guiding a movement of the first saw unit. This facilitates an exact positioning of the first saw unit.

According to an advantageous embodiment of the invention, the first saw unit can be moved in a direction parallel to the feed axis and the second saw unit is fixed relative to the feed axis. This allows the second sawing plane to be used as a reference plane for the spacing of the sawing planes with respect to one another.

According to a further advantageous embodiment of the invention, it is provided that the second saw unit can be moved in a direction parallel to the feed axis. A spacing of the second sawing plane with respect to the first sawing plane can thus be adjusted. Moreover, the freeing of a sawing tool, which is in contact with mutually adjacent workpiece portions, can be facilitated, as described below with reference to the description of a method according to the invention for sawing a workpiece.

In a saw device with a movable second saw unit, it is possible for the first saw unit to also be movable in the direction parallel to the feed axis or for the first saw unit to be fixed.

The saw device advantageously comprises a second saw unit drive for a movement of the second saw unit in a direction parallel to the feed axis. A movement of the second saw unit can thus be automated.

The saw device preferably comprises a second guide mechanism to guide a movement of the second saw unit. This facilitates the exact positioning of the second saw unit.

According to an advantageous embodiment of the invention, the saw device comprises a first transport mechanism arranged in the front device region. This allows the transport of a workpiece provided for sawing and/or the transport of a first workpiece portion arranged in the front device region.

The first transport mechanism can advantageously be moved in a direction parallel to the feed axis. The workpiece or the first workpiece portion can thus be moved in that the transport mechanism grips the workpiece or the first workpiece portion and then a unit formed from the first transport mechanism and the workpiece or a unit formed from the first transport mechanism and the first workpiece portion is moved in the direction parallel to the feed axis. As a result, reliable and rapid transport of the workpiece or the first workpiece portion is made possible.

To automate the transport of the workpiece or the first workpiece portion it is advantageous if the saw device has a first transport mechanism drive for a movement of the first transport mechanism in a direction parallel to the feed axis.

It is also favorable if the saw device comprises a first transport mechanism guide for guiding a movement of the first transport mechanism. This facilitates the exact positioning of the workpiece or the first workpiece portion.

According to a particularly advantageous embodiment of the invention, the first transport mechanism and the first saw unit, viewed along the feed axis, can be arranged in a relative position, in which the first transport mechanism and the first saw unit overlap, at least in portions. The first transport mechanism can thus be brought into the direct vicinity of the first sawing plane, so a very exact sawing cut can be produced in the first sawing plane. Moreover, an overlapping of the first transport mechanism and the first saw unit, at least in portions, allows a space-saving arrangement of these device parts. This reduces the space requirement of the saw device not only during operation of the saw device, but also when the saw device is at a standstill. The space saved in this manner is then available, for example, for adjacent machine tools.

It is particularly advantageous if the first saw unit delimits a free space which extends transversely to the feed axis and in which at least one portion of the first transport mechanism can be disposed. This allows the first transport mechanism to be moved at least in portions into the free space delimited by the first saw unit, so a space-saving arrangement can be provided.

In an advantageous manner, the saw device comprises a second transport mechanism arranged in the central device region. This allows simple transport of a second workpiece portion arranged in the central device region.

The second transport mechanism can preferably be moved in a direction parallel to the feed axis. This allows a second workpiece portion arranged in the central device region to be gripped and the second transport mechanism to be moved together with the gripped second workpiece portion.

For an automated movement of the second transport mechanism in a direction parallel to the feed axis, it is advantageous if the saw device comprises a second transport mechanism drive.

It is furthermore preferred if the saw device comprises a second transport mechanism guide to guide a movement of the second transport mechanism. This facilitates the exact positioning of the second transport mechanism and therefore a second workpiece portion.

It is furthermore advantageous if the second transport mechanism and the first saw unit and/or if the second transport mechanism and the second saw unit, as viewed along the feed axis, can be arranged in a relative position in which the second transport mechanism and the first saw unit and/or in which the second transport mechanism and the second saw unit overlap at least in portions. This allows a very compact arrangement of the saw units and the second transport mechanism, in particular if the saw units are arranged spatially close to one another. This spatial closeness, during operation of the saw device, allows very short workpiece portions to be produced and, during a standstill of the saw device, a particularly compact overall structure.

According to an advantageous embodiment of the invention, the first saw unit delimits a free space extending transversely to the feed axis and/or the second saw unit delimits a free space extending transversely to the feed axis, in which space or spaces at least one portion of the second transport mechanism can be disposed. As a result, the first saw unit and the second transport mechanism and/or the second saw unit and the second transport mechanism can be arranged in such a way that the saw device only takes up a small amount of installation space.

Advantageously, the saw device comprises a third transport mechanism arranged in the rear device region. This allows a third workpiece portion arranged in the rear device region to be transported.

Advantageously, the third transport mechanism can be moved in a direction parallel to the feed axis. As a result, the cut face of a third workpiece portion can be moved out of the second sawing plane, so that a sawing tool of the second saw unit can be freed.

To automate a movement of the third transport mechanism in a direction parallel to the feed axis, it is preferred if the saw device comprises a third transport mechanism drive.

It is favorable if the saw device comprises a third transport mechanism guide to guide a movement of the third transport mechanism, so the third transport mechanism can be positioned precisely.

It is furthermore advantageous if the third transport mechanism and the second saw unit, viewed along the feed axis, can be arranged in a relative position, in which the third transport mechanism and the second saw unit overlap at least in portions. This allows a space-saving arrangement of the third transport mechanism and the second saw unit.

According to an advantageous embodiment of the invention, it is provided that the second saw unit delimits a free space extending transversely to the feed axis, in which at least one portion of the third transport mechanism can be disposed. This also allows a compact structure of the saw device.

It is particularly advantageous if the saw device comprises a guide mechanism to guide a movement of the first saw unit and to guide a movement of the second saw unit. A guide mechanism of this type allows the guidance of the two saw units, so a precise positioning of the saw units relative to one another is facilitated.

It is furthermore preferred if the saw device comprises a transport mechanism guide to guide a movement of the at least two transport mechanisms. This facilitates an exact positioning of at least two transport mechanisms relative to one another. With the aid of a transport mechanism guide to guide a movement of a plurality of transport mechanisms, the number of components of the saw device can moreover be reduced.

It is particularly advantageous if this saw device comprises a guide mechanism to guide a movement of at least one saw unit and a transport mechanism guide to guide a movement of at least one transport mechanism, and the guide mechanism and the transport mechanism guide are arranged offset with respect to one another in such a way that they are at different spacings from the feed axis. A movement space required for a saw unit and for a transport mechanism can thereby be increased, so the saw device is suitable to produce very short and also comparatively long workpiece portions. Moreover, the offset of the guide mechanism and the transport mechanism guide allows at least one saw unit and at least one transport mechanism to be able to be arranged such that they together only take up a small amount of installation space.

The first saw unit and/or the second saw unit is or are advantageously configured to saw metallic materials.

It is particularly preferred if the first saw unit and/or the second saw unit is or are a band saw unit. A band saw unit has the advantage that the cutting channel produced by a saw band in a workpiece is comparatively narrow. As a result the volume of removed material and therefore the material waste caused by the sawing of the workpiece is reduced. Moreover, the saw band can be driven at comparatively low drive powers.

The band saw unit advantageously comprises a saw frame. This allows a very rigid and robust structure of a saw unit.

The saw frame can advantageously be moved in a vertical direction in relation to the direction of gravity. This allows a sawing plane to be specified with a vertical course in relation to the direction of gravity.

It is favorable if the band saw unit comprises a saw band guide mechanism. This allows exact guidance of the saw band of the band saw unit.

It is preferred if the saw band guide mechanism of a saw unit extends in a plane, which extends at an angle to the sawing plane associated with this saw unit. This allows a compact structure of the saw unit and careful guidance of a saw band.

It is particularly preferred if a saw band guide mechanism of the first saw unit and a saw band guide mechanism of the second saw unit are arranged on sides of the saw units remote from one another. This allows the spacing between the sawing planes to be reduced to such an extent that very short workpiece portions can also be produced.

According to one embodiment of the invention, the saw device comprises a machine frame, on which the first saw unit and/or the second saw unit is or are arranged. This increases the stability of the saw device.

It is particularly preferred if the saw device comprises a control mechanism to coordinate a movement of at least one saw unit and at least one transport mechanism. The control mechanism allows efficient and disturbance-free operation of the saw device.

It is favorable if a sawing tool of the first saw unit and/or a sawing tool of the second saw unit can be freed on completion of a sawing process. An unimpeded "moving out" of the respective sawing tool is thereby possible.

It is furthermore favorable if a workpiece can simultaneously be sawn with the first saw unit and the second saw unit. This produces an effective sawing capability while minimizing the time outlay to saw workpieces.

The invention furthermore relates to a method for sawing a workpiece.

The invention is based on the further object of providing a method for sawing a workpiece, with which a high cutting efficiency can be produced.

This object is achieved in a method for sawing a workpiece, in that a workpiece is positioned relative to a saw device, in that it is moved in a feed direction along a feed axis of the saw device, so that the workpiece passes through a first sawing plane extending transversely to the feed axis and a second sawing plane extending transversely to the feed axis, in that the workpiece is divided into three workpiece portions, in that a first saw unit associated with the first sawing plane and in that a second saw unit associated with the second sawing plane are in each case transferred from a rest position, in which the saw units are disengaged from the workpiece, into a working position, in which the saw units are engaged with the workpiece, in that at least two of the three workpiece portions are moved independently of one another along the feed axis, in that the first saw unit and/or the second saw unit is moved in the direction parallel to the feed axis, before at least one of the saw units is transferred from its working position into its rest position.

The movement of at least two of the three workpiece portions allows the cut faces of these workpiece portions to be disengaged from a sawing tool. As a result, the sawing tool of a saw unit is free when this saw unit is moved from its working position into its rest position. As a result, a friction-intensive contact of the sawing tool with a cut face of a workpiece portion produced with the aid of this sawing tool can be avoided. This increases the service life of the sawing tool and the cutting efficiency of the saw device.

According to an advantageous embodiment of the invention it is provided that, to position the workpiece relative to the saw device, the workpiece is moved by twice a spacing between the first sawing plane and the second sawing plane along the feed axis. This allows the production of workpiece portions of identical length to be introduced with only one positioning process. It is also possible for the workpiece to be moved along the feed axis by an amount, which differs from twice the spacing between the first sawing plane and the second sawing plane. As a result, the production of workpiece portions of different lengths can be introduced.

It is preferred if a first workpiece portion arranged in front of the first sawing plane, viewed in the feed direction, is moved in the direction opposing the feed direction by a first return stroke amount. As a result, a cut face of the first workpiece portion can be spaced apart from a sawing tool of the first saw unit.

It is furthermore preferred if the first saw unit is moved in the direction opposing the feed direction by a second return stroke amount, which is smaller than the first return stroke amount. This allows the sawing tool of the second saw unit to also be disengaged from a cut face of a second workpiece portion facing the first workpiece portion. As the second return stroke amount is smaller than the first return stroke amount mentioned above, the sawing tool of the first saw unit can be disengaged from the first workpiece portion and also disengaged from the second workpiece portion.

It is furthermore preferred if a second workpiece portion arranged between the sawing planes is moved in the direction opposing the feed direction by a third return stroke amount which is smaller than the second return stroke amount. This has the advantage that the sawing tool of the first saw unit remains completely freed and additionally a rear cut face of the second workpiece portion can be spaced apart from a sawing tool of the second saw unit.

It is furthermore preferred if a third workpiece portion arranged behind the second sawing plane, viewed in the feed direction, can be moved in the feed direction by a forward stroke amount. As a result, a cut face of a third workpiece portion can also be spaced apart from a sawing tool of the second saw unit.

The methods described above are particularly suitable for a saw device, in which the first saw unit can be moved in a direction parallel to the feed axis and in which the second saw unit is fixed. The above-described methods can be carried out with a dynamic reversal for a saw device with a fixed first saw unit and a movable second saw unit.

According to a further embodiment of the invention it is provided that following a transfer of the first saw unit and the second saw unit into their rest positions, the workpiece portions are moved in the feed direction in that a first workpiece portion arranged in front of the first sawing plane, viewed in the feed direction, is moved in the feed direction and directly drives a second workpiece portion arranged between the sawing planes and drives a third workpiece portion arranged behind the second sawing plane, viewed in the feed direction, by means of the second workpiece portion. This has the advantage that to push the workpiece portions produced by sawing a workpiece out of a saw device, only one transport mechanism is required, which drives the first workpiece portion. The second workpiece portion and the third workpiece portion are pushed out of the saw device with the aid of the first workpiece portion.

Upon a repetition of a method described above for sawing a workpiece, it is advantageous if the first workpiece portion produced during the first cycle of a method described above forms a workpiece to be sawn for a following cycle of a method described above, which can be divided into three workpiece portions.

The invention furthermore relates to the use of a device described above for carrying out a method described above.

Further features and advantages of the invention are the subject of the following description and the graphical view of a preferred embodiment.

BRIEF DESCRIPTION OF THE DRAWINGS

The present invention will hereinafter be described in conjunction with the appended drawing figures, wherein like reference numerals denote like elements, and:

FIGS. 5a to 5i show schematic side views of the saw device from FIG. 1 in various phases of an embodiment of a method according to the invention for sawing a workpiece.

FIGS. 6a to 6i show the schematic side views of the saw device of FIG. 1 in various phases of a second embodiment method.

DETAILED DESCRIPTION OF THE INVENTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

An embodiment of a saw device designated 10 is shown in FIGS. 1 to 4. The saw device 10 has a front end 12 and a rear end 14. Extending between the front end 12 and the rear end 14 is a feed axis 16, along which a workpiece not shown in FIGS. 1 to 4 can be moved in a feed direction 18 from the front end 12 to the rear end 14.

The saw device 10 has a machine frame 20, with which the saw device 10 can be placed on a standing surface (without reference numerals). The machine frame 20 has a front frame part 22 and a rear frame part 24.

The feed axis 16 extends in a horizontal direction in relation to the direction of gravity. The feed axis 16 is defined by a transport path 26, which extends between the front end 12 and the rear end 14 of the saw device 10. The transport path 26 comprises a large number of transport rollers 28, the axes of which (without reference numerals) extend perpendicularly to the feed axis 16 and parallel to one another.

Arranged on the front frame part 20 of the machine frame 20 is a first transport mechanism 30, which is designated as a whole by 30, with which a workpiece or a workpiece portion can be gripped and moved along the feed axis 16.

Arranged on the front frame part 22 of the machine frame 20 is a saw unit designated as a whole by 32, which is configured as a band saw unit.

A second transport mechanism 34 (see in particular FIG. 2) for transporting a workpiece or a workpiece portion is arranged on the rear frame part 24 of the machine frame 20. Furthermore, a saw unit designated as a whole by 36 and configured as a band saw unit is arranged on the rear frame part 24. Finally, a third transport mechanism 38 (see FIGS. 3 and 4) for transporting a workpiece or a workpiece portion along the feed axis 16 is arranged on the rear frame part 24 of the machine frame 20.

The first saw unit 32 is movably arranged on the front frame part 22; the second saw unit 36 is rigidly connected to the rear frame part 24.

Figure 1:
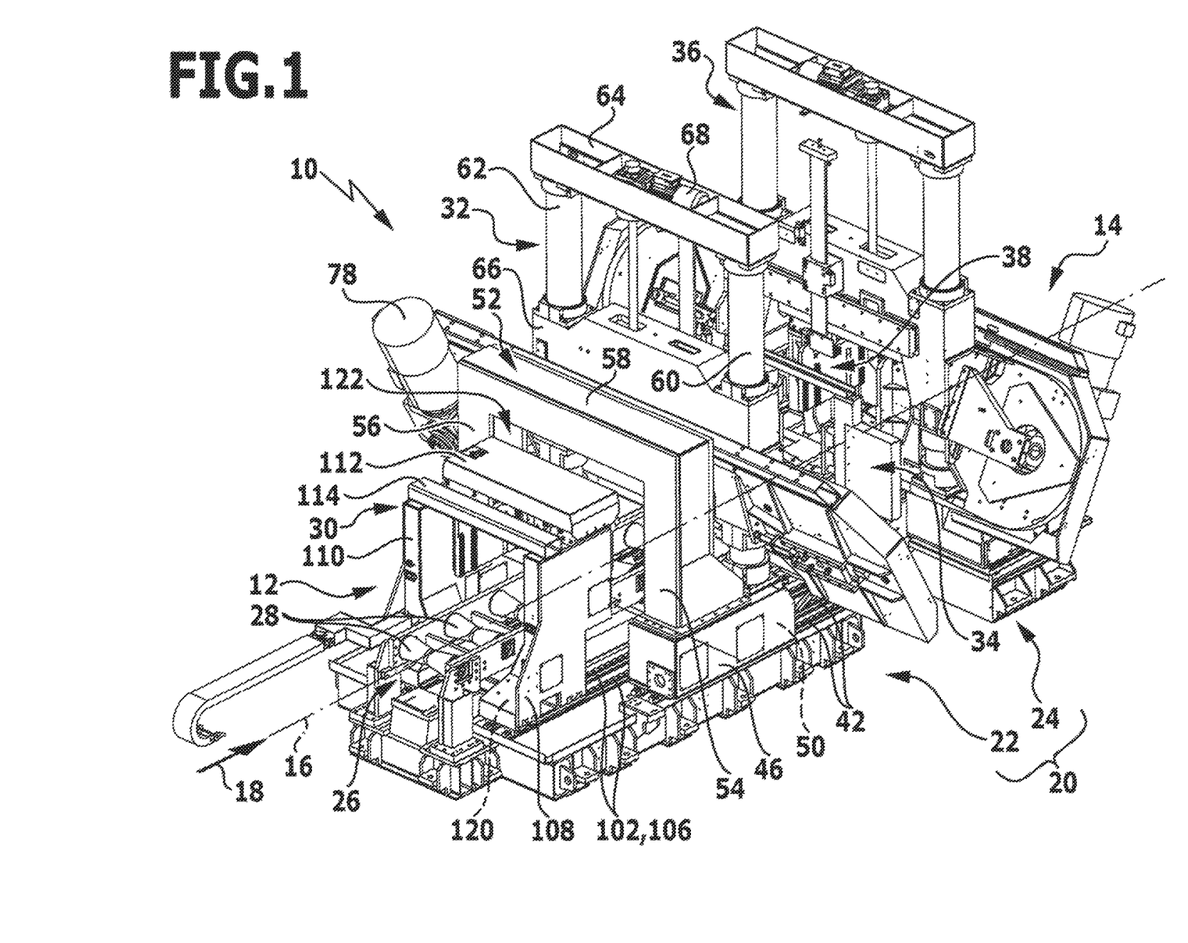
FIG. 1 shows a perspective view of an embodiment of a saw device according to the invention.
Figure 4:
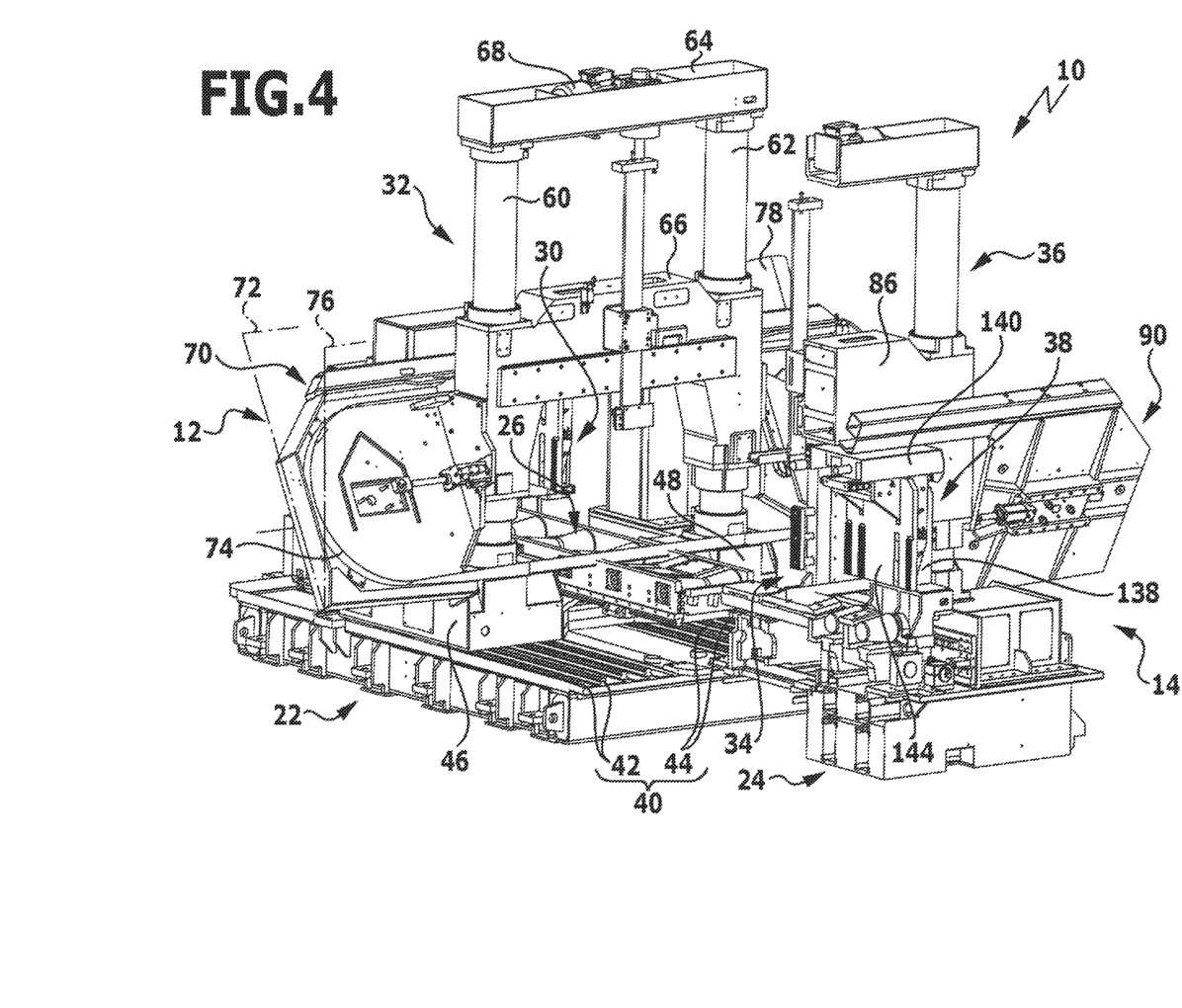
FIG. 4 shows a partially sectional perspective view of the saw device from FIG. 1 from a rear perspective.

With further reference to FIGS. 1 and 4, the mounting of the first saw unit 32 on the front frame part 22 and the structure of the first saw unit 32 are described below.

Provided on the upper side of the front frame part 22 is a first guide mechanism designated as a whole by 40 in FIG. 4 to guide the first saw unit 32. The first guide unit comprises a first rail pair 42 and a second rail pair 44. The rail pairs 42 and 44 extend parallel to the feed axis 16 and, in relation to a plane extending in the vertical direction along the feed axis 16, are arranged on either side of this plane.

The first saw unit 32 has a first slide 46, which can be displaced along the rail pair 42. Furthermore, the saw unit 32 has a second slide 48 (cf. FIG. 4), which can be displaced along the rail pair 44.

The first saw unit 32 has a saw unit drive 50 arranged in the slide 46 and/or in the slide 48.

The slide 46 and the slide 48 are connected to one another by a reinforcement frame 52. The reinforcement frame 52 has a first side part 56 connected to the slide 46 and a second side part 56 connected to the slide 48. The side parts 54 and 56 extend in the vertical direction and are connected at their upper end with the aid of an upper frame part 58.

The first saw unit 32 has two cylindrical pillars 60 and 62 extending in the vertical direction, which are connected at their lower end to one of the slides 46, 48. The pillars 60 and 62 are connected at their upper end with the aid of an upper beam 64.

The first saw unit 32 comprises a saw frame 66, which is displaceably guided in the vertical direction on the pillars 60 and 62. The saw frame 66 can be driven in the vertical direction with the aid of a saw frame drive 68 arranged on the upper beam 64 of the first saw unit 32.

The saw frame 66 is rigidly connected to a saw band guide mechanism designated as a whole by 70. It extends in a plane designated 72 in FIG. 4. A peripherally closed saw band 74 is guided with the aid of the saw band guide mechanism 70. Said saw band extends with its upper strand on the side of the pillars 60 and 62 facing the front end 12 of the saw device 10. The saw band 74, with its lower strand, runs on the side of the columns 60 and 62 facing the rear end 14 of the saw device 10.

The lower strand of the saw band 74 extends in the region of the transport path 26 within a first sawing plane 76. The first sawing plane 76 is arranged transversely and in particular perpendicularly to the feed axis 16.

The first saw unit 32 furthermore comprises a saw band drive 78, which is arranged on the side of the first saw unit 32 facing the front end 12 of the saw device.

The structure of the second saw unit 36 is described below with reference to FIGS. 2 and 3.

The second saw unit 36 has two cylindrical pillars 80 and 82 extending in the vertical direction. The pillars 80 and 82 are rigidly connected to the rear frame part 24 of the machine frame 20. The pillars 80 and 82 are connected at their upper end with the aid of an upper beam 84. The pillars 80 and 82 are used for the displaceable mounting of a saw frame 86, which can be moved along the pillars 80 and 82 in the vertical direction. A saw frame drive 88, which is arranged on the upper beam 84, is provided for a drive of the movement of the saw frame 86.

Figure 2:
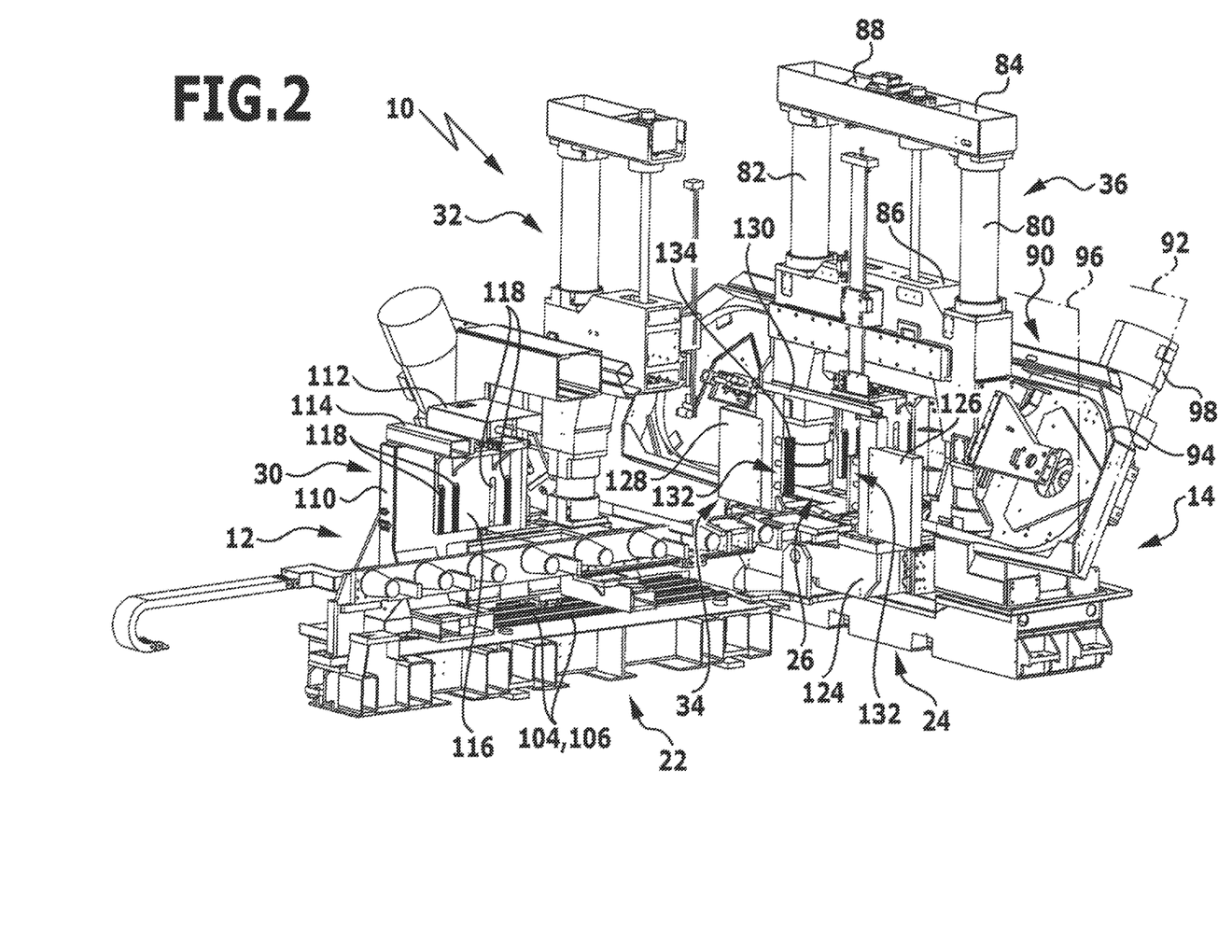
FIG. 2 shows a partially sectional perspective view of the saw device from FIG. 1.
Figure 3:
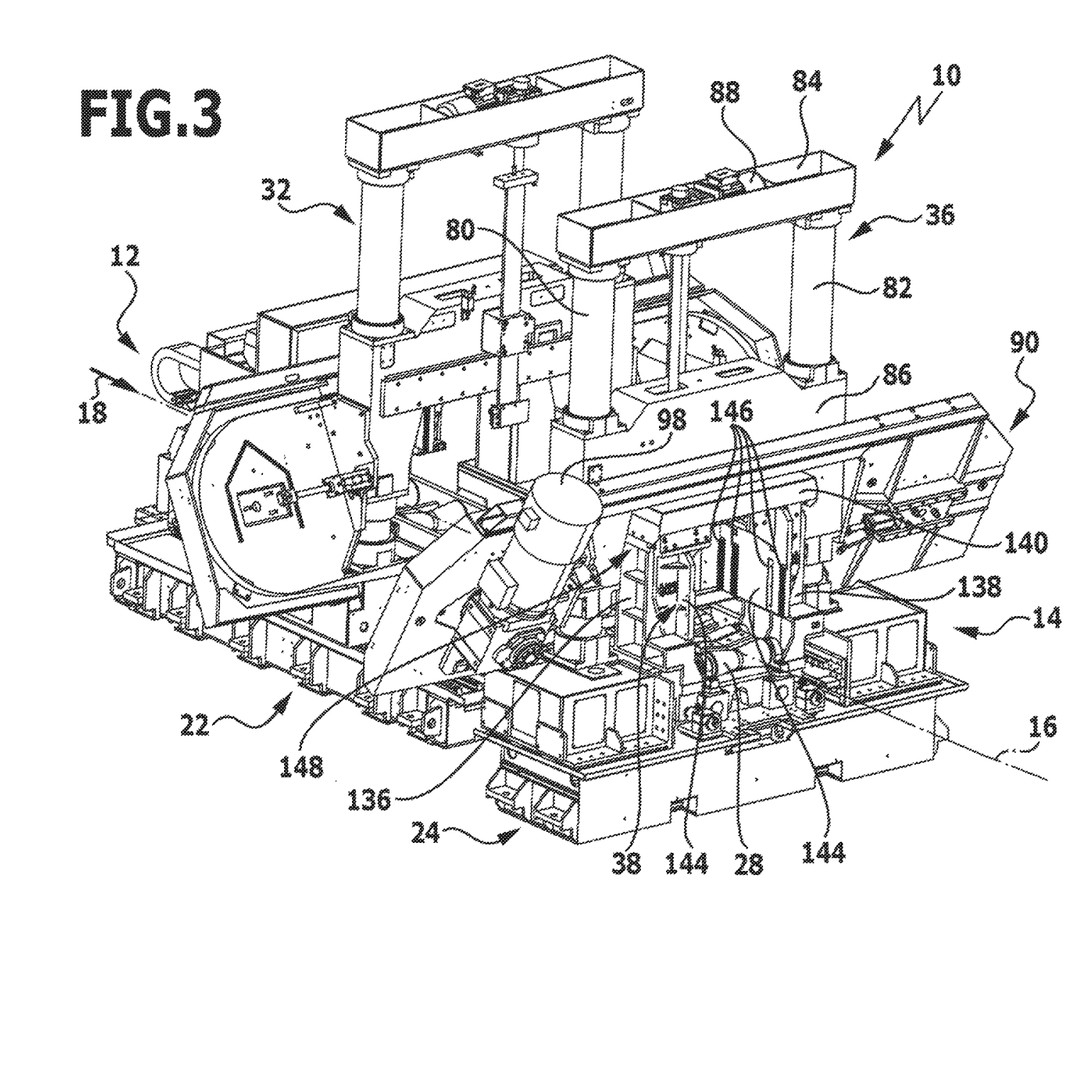
FIG. 3 shows a perspective view of the saw device from FIG. 1 from a rear perspective.

The second saw unit 36 has a saw band guide mechanism 90, which extends in a plane 92 (see FIG. 2). The saw band guide mechanism 90 is used to guide a saw band 94, the upper strand of which is guided on the side of the pillars 80, 82 facing the rear end 14 of the saw device 10. The lower strand of the saw band 94 runs on the side of the pillars 80, 82 facing the front end 12 of the saw device 10. The lower strand of the saw band 94 runs in the region of the transport path 26 of the saw device 10 within a second sawing plane 96, which extends in the vertical direction.

The first sawing plane 76 of the first saw unit 32 and the second sawing plane 96 of the second saw unit 36 extend parallel to one another. The planes 76 and 72 together enclose an acute angle of 30° for example. The planes 92 and 96 together enclose an acute angle of 30°, for example. As the saw band guide mechanisms 70 and 90 are arranged on mutually remote sides of the first saw unit 32 and the second saw unit 36, it is possible to arrange the first sawing plane 76 and the second sawing plane 96 with a relatively small spacing with respect to one another.

With further reference to FIGS. 1 and 2, the mounting and the structure of the first transport mechanism 30 are described below.

A rail pair 102, which extends parallel to the feed axis 16, is arranged on the upper side of the front frame part 22 of the machine frame 20. This rail pair is shown in FIG. 1. Furthermore, arranged on the upper side of the front frame part 22 is a rail pair 104, which is shown in FIG. 2 and also extends parallel to the feed axis 16. The rail pairs 102 and 104 together form a first transport mechanism guide 106. The rail pairs 102 and 104 are arranged symmetrically to the feed axis 16 and are arranged between the rail pairs 42 and 44 of the first guide mechanism 40 of the first saw unit 32.

The first transport mechanism 30 has a first wall part 108, which is displaceably guided along the rail pair 102. The first transport mechanism 30 has a second wall part 102, which is displaceably guided along the rail pair 104. The wall parts 108 and 110 are rigidly connected to one another by a cover part 112 and by a reinforcement element 114.

Arranged in each of the wall parts 108, 110 of the first transport mechanism 30 is a gripping element 116, which has gripping faces 118 facing the transport path 26, arranged in the vertical direction and parallel to one another. The gripping elements 116 are movable relative to the wall parts 108 and 110, so they can be moved in the direction of the transport path 26 to grip a workpiece or a workpiece portion.

The slides 46 and 48 together with the reinforcement frame 52 of the first saw unit 32 delimit a free space designated 122 in FIG. 1. This free space 122 is dimensioned such that the first transport mechanism 30 with its wall parts 108 and 110 and with its cover part 112 and its reinforcement element 114 can be introduced into this free space 122. For this purpose, the first transport mechanism 30 and the first saw unit 32 can be moved relative to one another along the feed axis 16.

The mounting and the structure of the second transport mechanism 34 are described below with reference to FIG. 2.

The second transport mechanism 34 is movably mounted in a direction parallel to the feed axis 16 on a support element 124, which is fastened on the rear frame part 24. For a movement of the transport mechanism 34 in the direction parallel to the feed axis 16, the second transport mechanism 34 has a second transport mechanism guide (without reference numerals) and a second transport mechanism drive (without reference numerals).

The second transport mechanism 34 has side parts 126 and 128 arranged on mutually opposing sides of the feed axis 16, which extend in the vertical direction. The wall parts 126 and 128 are connected at their upper ends to a frame part 130, which extends in the horizontal direction.

Each wall part 126 and 128 has a gripping element 132. Each of the gripping elements 132 has a gripping face 134 facing the transport path 26 and substantially extending in the vertical direction. The gripping elements 132 may be displaced in the horizontal direction in the direction of the feed axis 16 to a grip a workpiece or a workpiece portion.

The structure of the third transport mechanism 38 will be described below with reference to FIGS. 3 and 4.

The third transport mechanism 38 is guided by a third transport mechanism guide, not shown in the drawings, so the third transport mechanism 38 is movable in the direction parallel to the feed axis 16. The third transport mechanism comprises a transport mechanism drive not shown in the drawings for a drive of the transport mechanism 38 along the feed axis 16.

The third transport mechanism 38 has wall parts 136 and 138 which are arranged on mutually opposing sides of the feed axis 16, extend in the vertical direction and are connected at their upper ends with the aid of a cover part 140. Mounted in each case on the wall parts 136 and 138 is a gripping element 144 which has gripping faces 146 extending in the vertical direction. The gripping elements 144 can be moved in the direction of the feed axis 16 to grip a workpiece arranged in the region of the transport path 26 or a workpiece portion arranged there.

The geometry of the saw frame 86 and the saw band guide mechanism 90 of the second saw unit 36 is selected such that a free space 148 surrounding the transport path 26 is produced. The third transport mechanism 38 can be moved into this free space so the saw frame 86 and the saw band guide mechanism 90 surround the third transport mechanism 38 (compare also FIG. 4).

The mode of functioning of the saw device 10 will be described below with reference to FIGS. 5a to 5i.

The feed axis 16 of the saw device 10 is shown in FIGS. 5a to 5i. The sawing planes 76 and 96 extend transversely and in particular perpendicularly to the feed axis 16. The first sawing plane 76 and the second sawing plane 96 have a spacing 150 with respect to one another (compare FIG. 5a). The sawing planes 76 and 96 between them delimit a central device region 152. The sawing plane 76 delimits a front device region 154 which is shown on the left-hand side in FIG. 5a and is arranged in front of the first sawing plane 76, viewed in the feed direction 18. The second sawing plane 96 delimits a rear device region 156, which is arranged behind the second sawing plane 96, viewed in the feed direction 18.

Figure 5A:
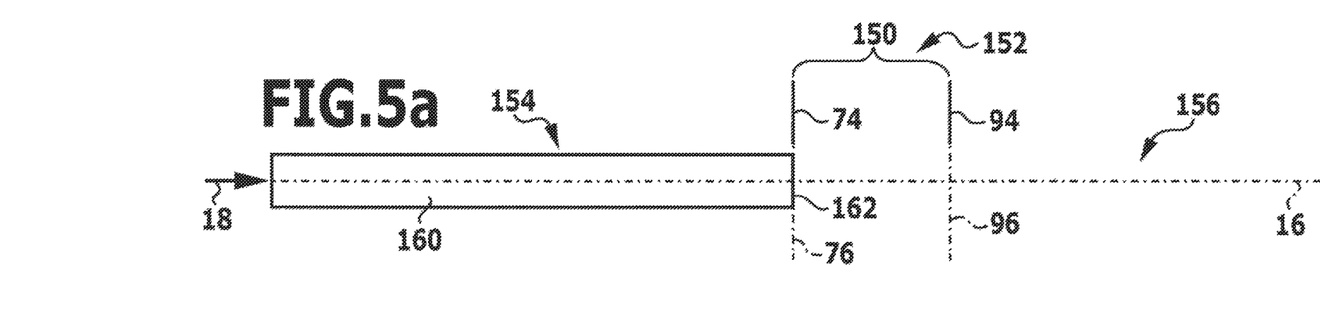

FIG. 5a shows a metallic, solid cylindrical workpiece 160 in a side view. The latter is arranged in the front device region 154 and extends along the feed axis 16. The workpiece 160 has a front workpiece end 162, which is arranged at the level of the first sawing plane 76. The saw belt 74 of the first saw unit 32 is shown in FIG. 5a in a rest position, in which the saw band 74 is disengaged from the workpiece 160. The saw band 94 of the second saw unit 36 is also shown in its rest position in FIG. 5a.

Proceeding from the position of the workpiece 160 shown in FIG. 5a, the workpiece is gripped with the aid of the transport mechanism 30, in that the gripping element 116 of the first transport mechanism 30 is moved in the direction of the workpiece 160 until the gripping faces 118 are in a non-positive engagement with the workpiece 160. The first transport mechanism 30 can then be moved with the aid of the first transport mechanism drive 120 in the feed direction 18 along the feed axis 16. The first transport mechanism 30 is moved here by a movement path parallel to the feed axis 16, the length of which is twice as long as the spacing 150 between the sawing planes 76 and 96. The workpiece 160 is thus moved from the position shown in FIG. 5a into the position shown in FIG. 5b, in which the workpiece 160 passes through the sawing planes 76 and 96.

Figure 5B:
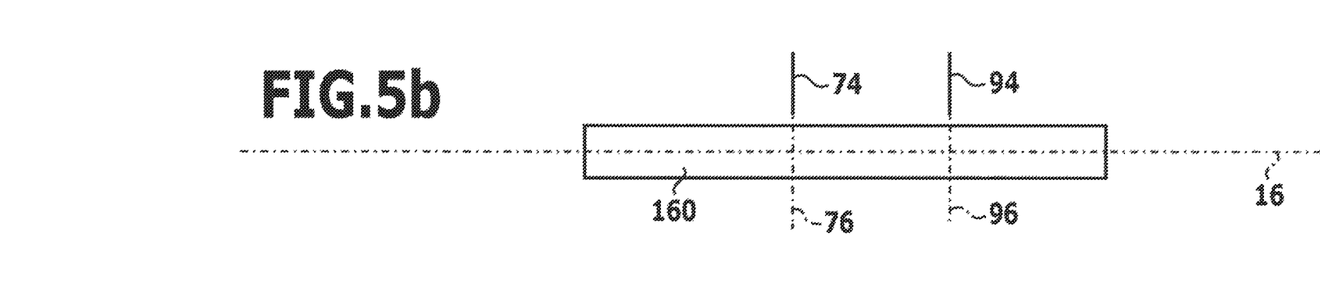
Figure 5C:
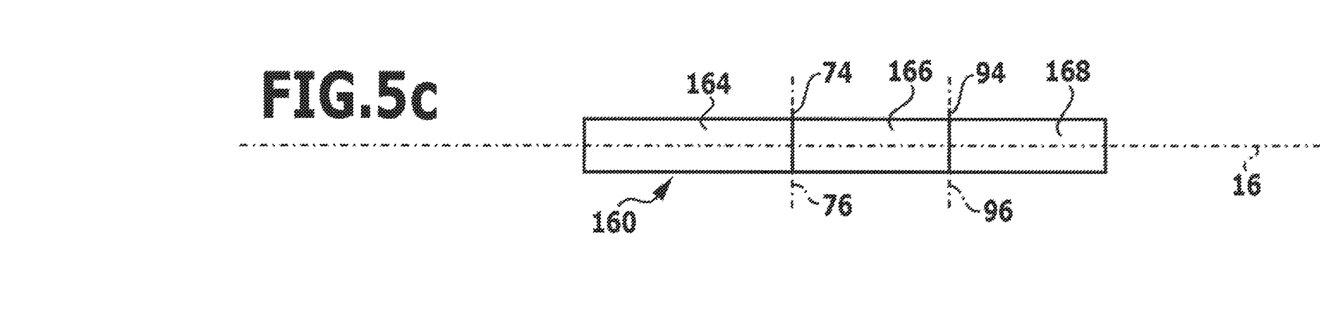

In a following method step, which is shown in FIG. 5c, the saw bands 74 and 94 are moved from their rest positions shown in FIG. 5b into their working positions shown in FIG. 5c, in which they are engaged with the workpiece 160. For this purpose, the saw frame 66 of the first saw unit 32 and the saw frame 86 of the second saw unit 36 are moved downwardly in the vertical direction in the direction of the transport path 26 with the aid of the saw frame drives 68 and 88. With the aid of the saw band drives 78 and 98, the saw bands 74 and 94 are driven in a circulating manner, so that they divide the workpiece 160 into three workpiece portions, namely into a first workpiece portion 164, which is arranged in the front device region 154, into a second workpiece region 166, which is arranged in the central device region 152, and into a third workpiece portion 168 which is arranged in the rear device region 156.

Figure 5D:
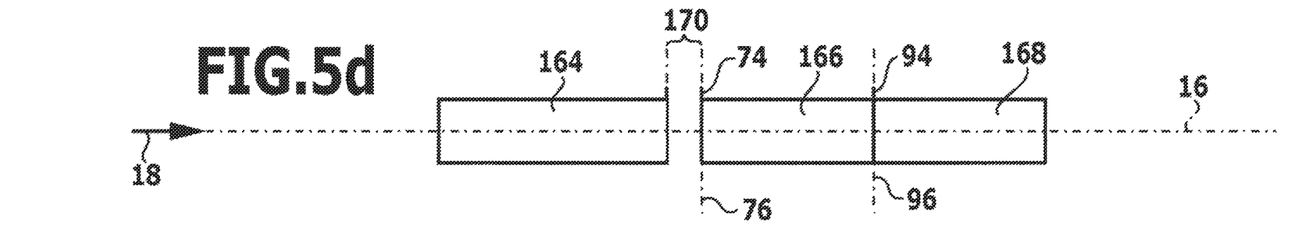

A method step following the division of the workpiece 160 into the workpiece portions 164 to 168 is shown in FIG. 5d. Proceeding from the position shown in FIG. 5c, the first workpiece portion 164 is moved in the direction opposing the feed direction 18 by a first return stroke amount 170, in that the first transport mechanism 30 is moved counter to the feed direction 18 by a corresponding amount. The first return stroke amount 170 may be 30 mm, for example.

Figure 5E:
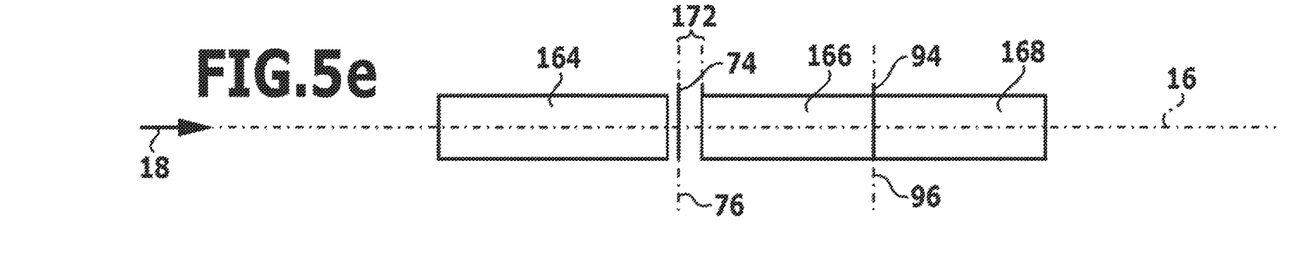

In a following method step shown in FIG. 5e, the first saw unit 32 is moved in the direction opposing the feed direction 18 with the aid of the saw unit drive 50 by a second return stroke amount 172, for example by 20 mm. The second return stroke amount 172 is smaller than the first return stroke amount 170.

Figure 5F:
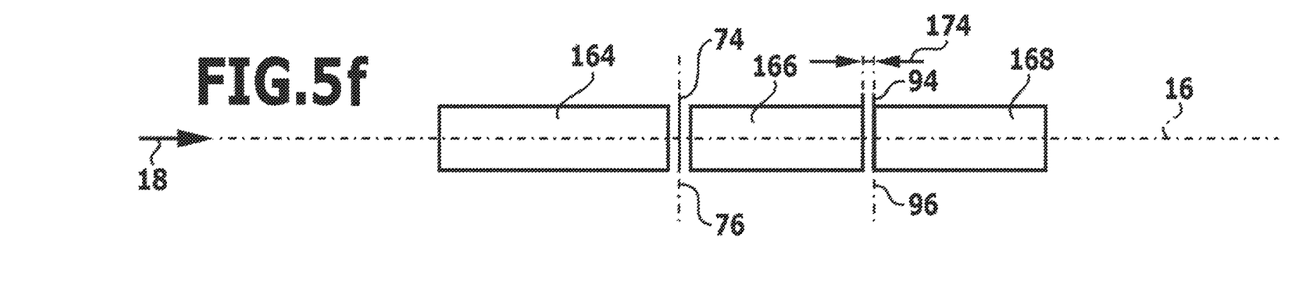

In a following method step shown in FIG. 5f, the second workpiece portion 166 is moved in the direction opposing the feed direction 18 along the feed axis 16, in that the second transport mechanism 34 grips the workpiece portion 166 with the aid of the gripping elements 132 and in this state is moved by a third return stroke amount 174 in the direction opposing the feed direction 18. The third return stroke amount 174 may, for example, be 10 mm. The third return stroke amount 174 is smaller than the second return stroke amount 172.

Figure 5G:
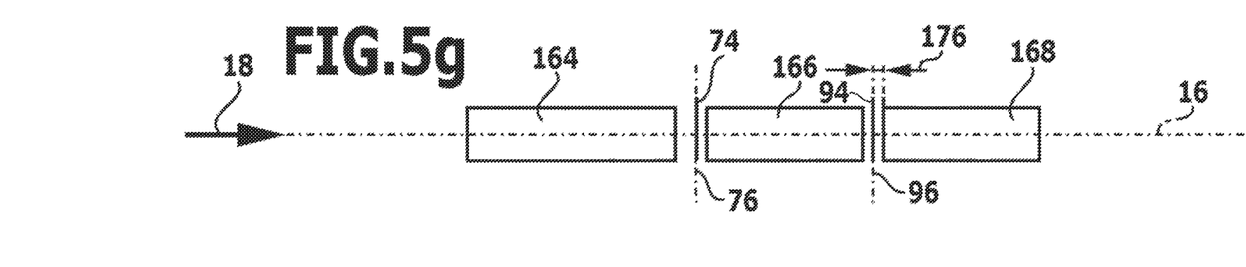
Figure 5H:
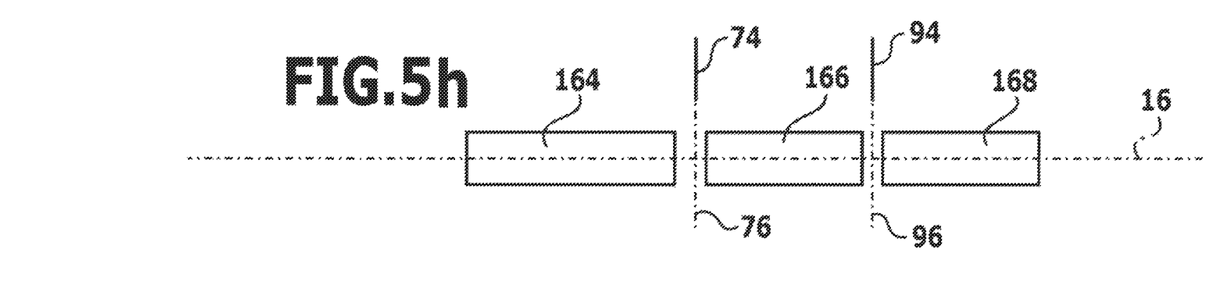

In a following method step shown in FIG. 5g, the third workpiece portion 168 is moved in the feed direction 18 by a forward stroke amount 176. For this purpose, the third transport mechanism 38, which grips the third workpiece portion 168, is displaced in the feed direction 18 in the direction parallel to the feed axis 16. The forward stroke amount 176 may be 10 mm, for example.

The method steps described with reference to FIGS. 5d to 5g mean that the saw bands 74 and 94, which are in their working positions in these phases of the method, are freed, so that the saw bands 74, 94 are no longer in contact with the cut faces of the workpiece portions 164 to 168 produced by the division of the workpiece 160. This allows the saw bands 74 and 94 to be moved from their working positions shown in FIG. 5g into their rest positions shown in FIG. 5h by lifting the saw frames 66 and 86, without thereby touching the cut faces of the workpiece portions 164 to 168.

Figure 5I:
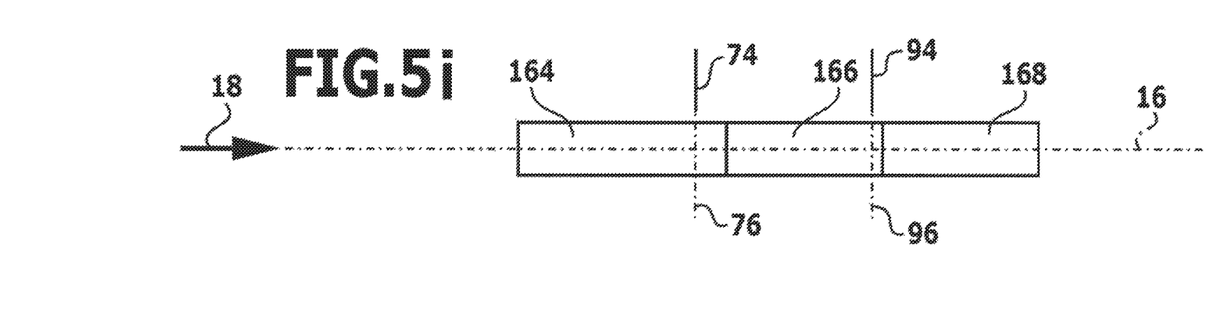
Figure 6A:
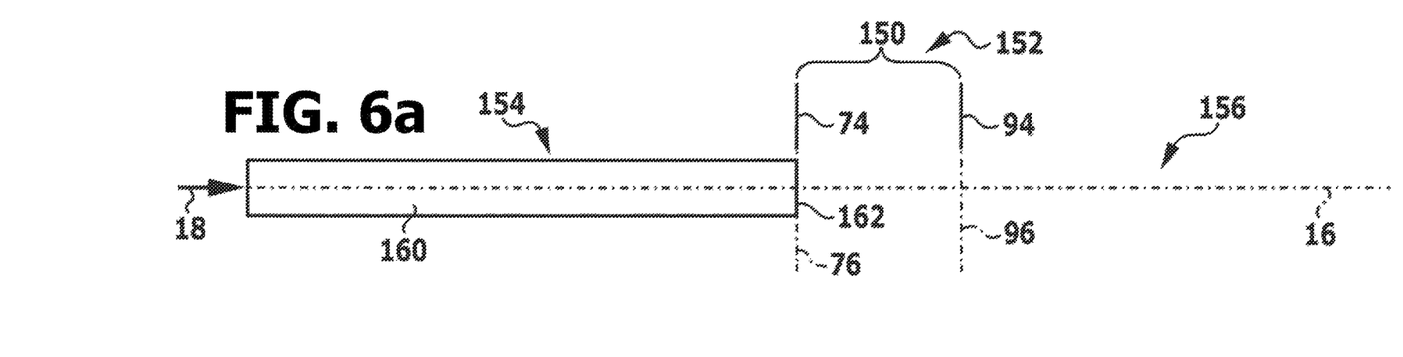
Figures 6B, 6C:
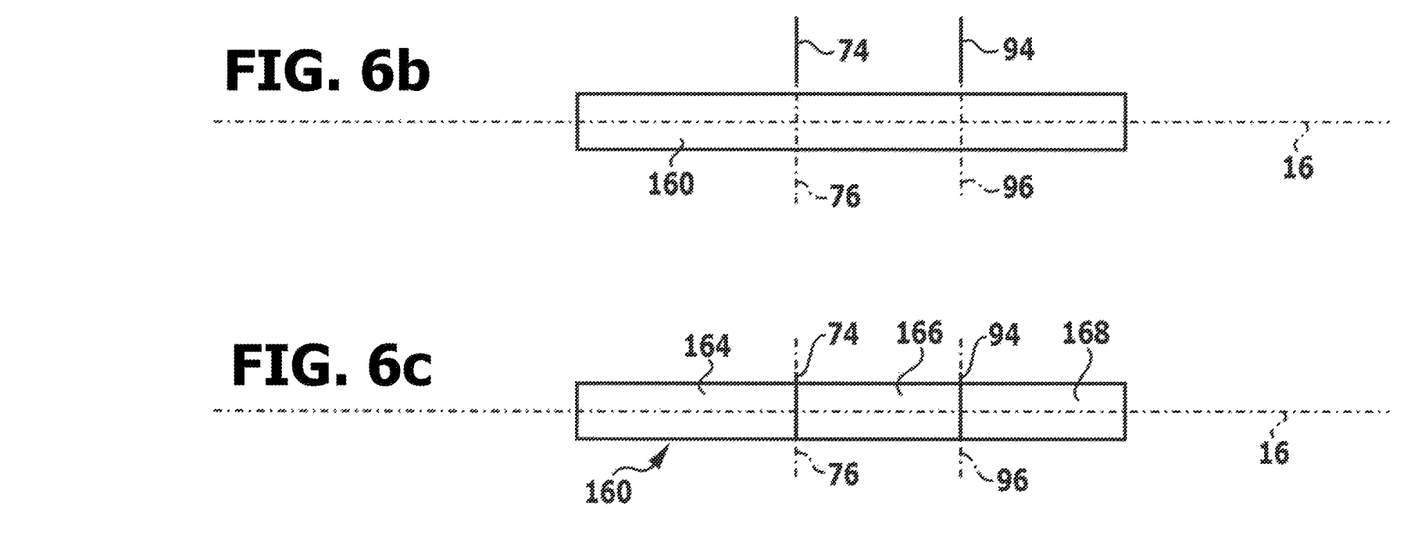
Figure 6D:
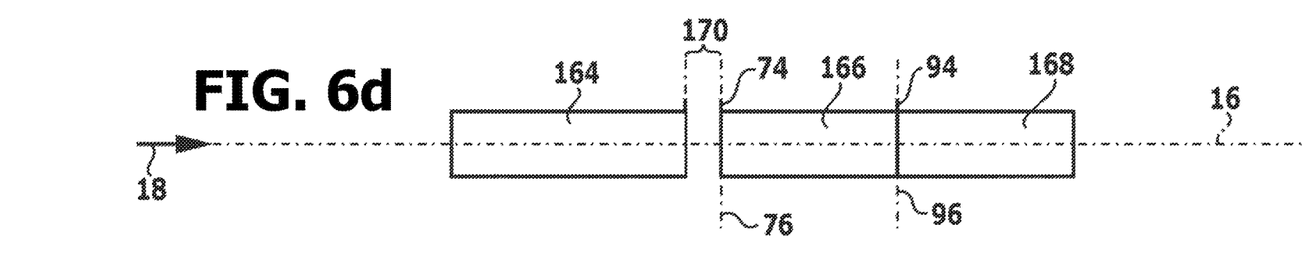
Figure 6E:
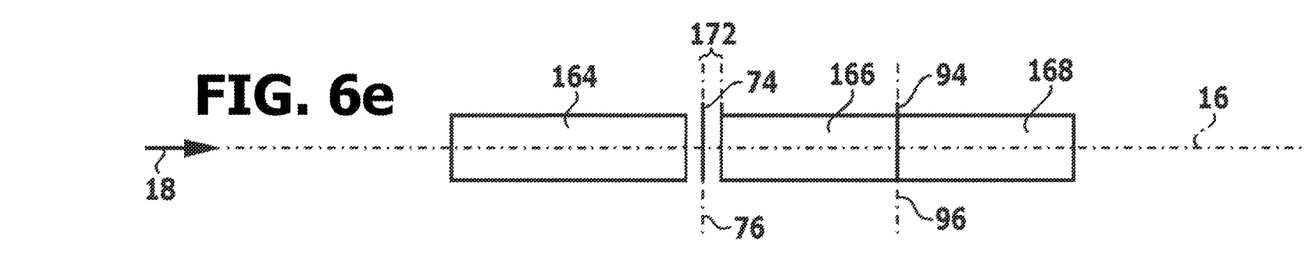
Figure 6F:
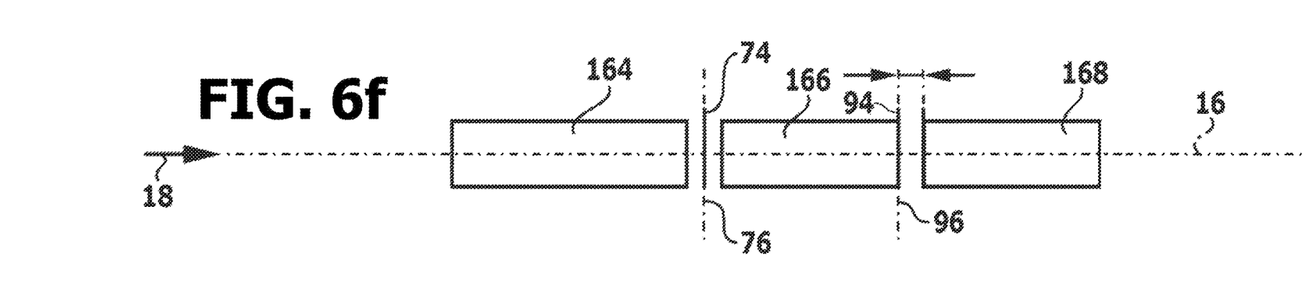
Figure 6G:
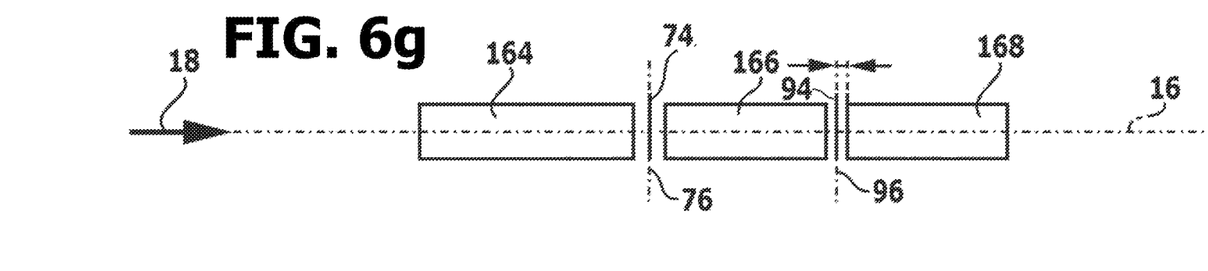
Figure 6H:
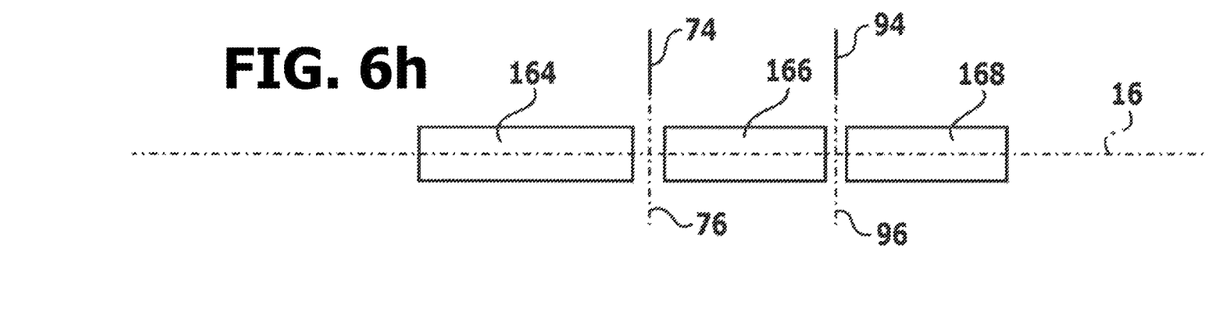
Figure 6I:
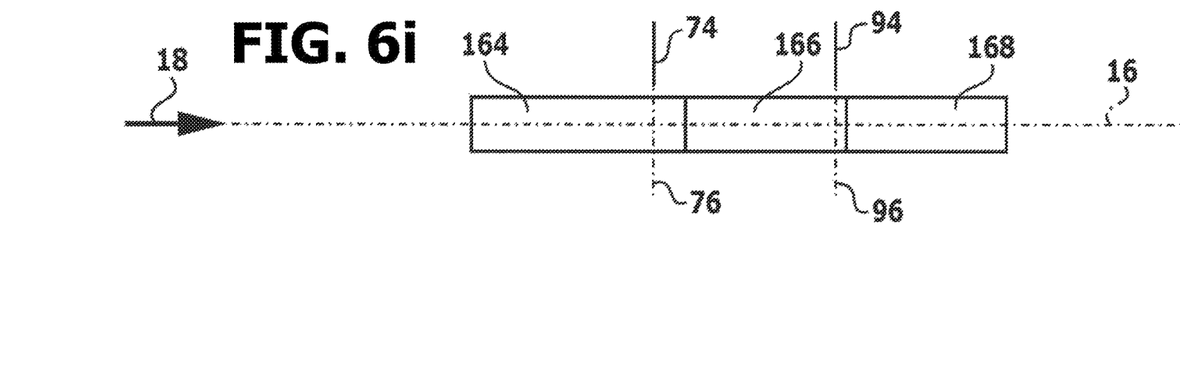

In a final method step, which is shown in FIG. 5i, the workpiece portions 166 and 168 can be pushed out of the saw device 10, in that the first workpiece portion 164 is moved with the aid of the first transport mechanism 30 in the feed direction 18 along the feed axis 16. The cut faces produced by the division of the workpiece 160 are thereby pressed onto one another, so it is possible with the aid of only one transport mechanism 30 to transport all the workpiece portions 164, 166, 168 out of the saw device 10.

Figures 6a-6i show a second embodiment method where the second saw unit is also movable in a direction parallel to the feed axis.

The saw device 10 is distinguished by a high cutting efficiency, in which the first saw until 32 and the second saw unit 36 can simultaneously saw a workpiece 160. With the aid of the transport mechanisms 30, 34 and 38 it is possible to handle the workpiece portions 164 to 168 produced by dividing a workpiece 160 in such a way that the saw bands 74 and 94 can be carefully brought from their working positions back into their rest position. As a result, the operating time of the saw device 10 is increased.

Owing to the mutually matched dimensions of the first saw unit 32 and the first transport mechanism 30 and the second saw unit 36 and the third transport mechanism 38, a very compact structure of the saw device 10 is made possible. The second transport mechanism 34 is distinguished by a comparatively flat structure, so the sawing planes 76 and 96 can be arranged close to one another if a very short second workpiece portion 166 is to be produced. Owing to the arrangement of the saw wall guide mechanism 70 and 90 on mutually remote sides of the saw units 32 and 36, it is also possible to bring the sawing planes 76 and 96 to a small spacing apart from one another.

It should now be appreciated that the present invention provides advantageous methods and apparatus for sawing a workpiece.

Although the invention has been described in connection with various illustrated embodiments, numerous modifications and adaptations may be made thereto without departing from the spirit and scope of the invention as set forth in the claims.

What is claimed is:
1. Method for sawing a workpiece, comprising:
   firstly, positioning a workpiece relative to a saw device;
   secondly, moving the workpiece in a feed direction along a feed axis of the saw device by twice a spacing between a first sawing plane and a second sawing plane, so that the workpiece passes through the first sawing plane and the second sawing plane, the first sawing plane extending transversely to the feed axis and the second sawing plane extending transversely to the feed axis;

thirdly, transferring a first saw unit associated with the first sawing plane and a second saw unit associated with the second sawing plane in each case from a rest position, in which the saw units are disengaged from the workpiece, into a working position, in which the saw units are engaged with the workpiece, to divide the workpiece into three workpiece portions;

wherein at least two of the three workpiece portions are movable independently of one another along the feed axis and at least one of the first saw unit and the second saw unit is movable in a direction parallel to the feed axis, before transferring at least one of the saw units from its working position into its rest position;

fourthly, automatically moving a first workpiece portion arranged in front of the first sawing plane, viewed in the feed direction, by a first return stroke amount in a direction opposing the feed direction such that the first workpiece portion is disengaged from the first saw unit after cutting of the workpiece;

fifthly, automatically moving the first saw unit in the direction opposing the feed direction by a second return stroke amount, which is smaller than the first return stroke amount, after the cutting of the workpiece;

sixthly, automatically moving a third workpiece portion arranged behind the second sawing plane, viewed in the feed direction, in the feed direction by a forward stroke amount;

seventhly, automatically moving the second saw unit in the feed direction by a second forward stroke amount, which is smaller than the first forward stroke amount;

eighthly, transferring the first saw unit and the second saw unit from the working positions into the rest positions; and ninthly, moving the workpiece portions in the feed direction, such that the first workpiece portion arranged in front of the first sawing plane, viewed in the feed direction, is moved in the feed direction and directly drives a second workpiece portion arranged between the sawing planes, and indirectly drives the third workpiece portion arranged behind the second sawing plane, viewed in the feed direction, by means of the second workpiece portion.

* * * * *

UNITED STATES PATENT AND TRADEMARK OFFICE
CERTIFICATE OF CORRECTION

| | | |
|---|---|---|
| PATENT NO. | : 9,561,554 B2 | |
| APPLICATION NO. | : 14/512522 | |
| DATED | : February 7, 2017 | |
| INVENTOR(S) | : C. Behringer | |

It is certified that error appears in the above-identified patent and that said Letters Patent is hereby corrected as shown below:

In the Claims

Column 14, Line 7:
"feed direction, in the feed direction by a forward stroke"
Should read:
-- feed direction, in the feed direction by a first forward stroke --

Signed and Sealed this
Twenty-third Day of May, 2017

Michelle K. Lee
*Director of the United States Patent and Trademark Office*